Patented Dec. 31, 1929

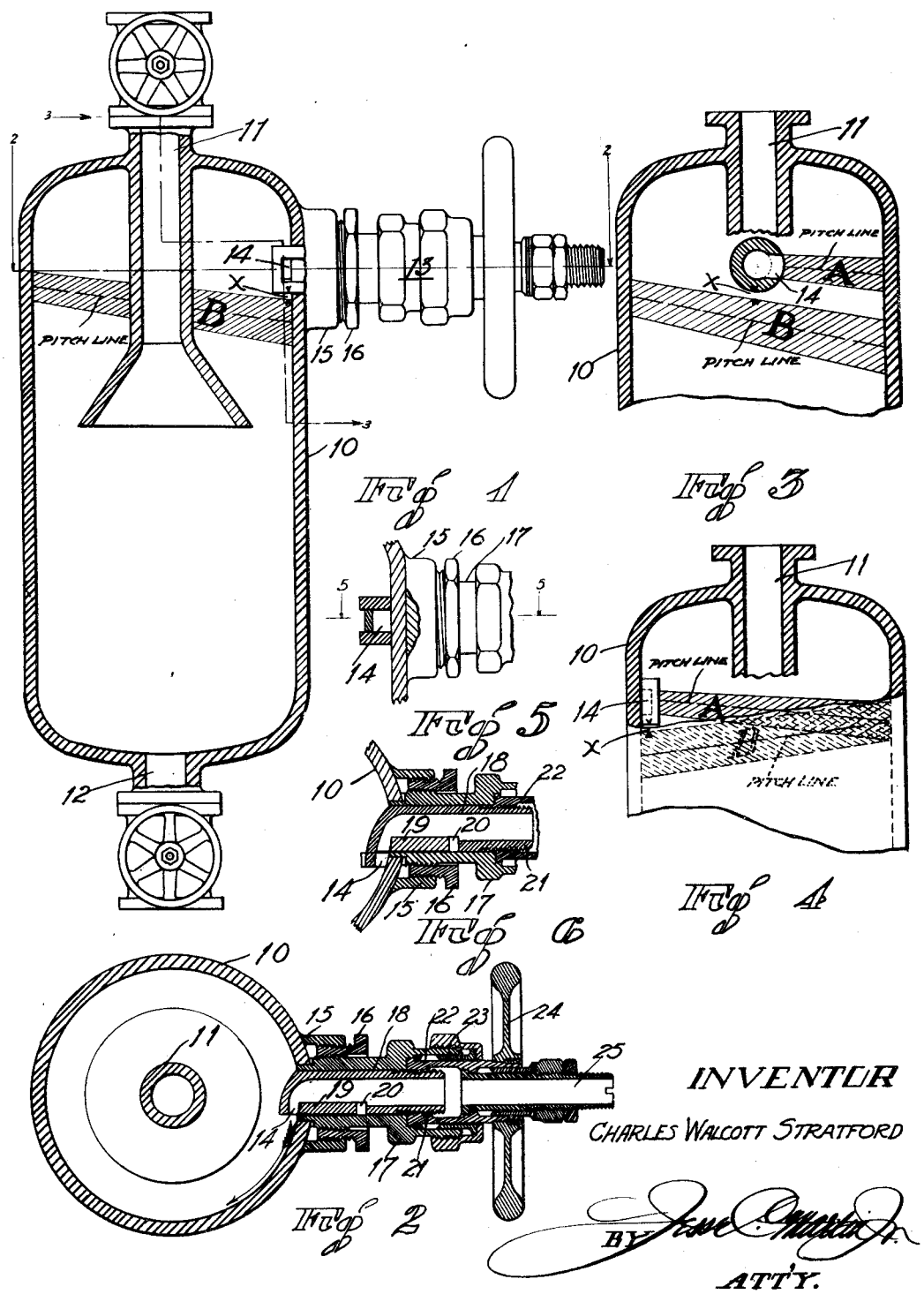

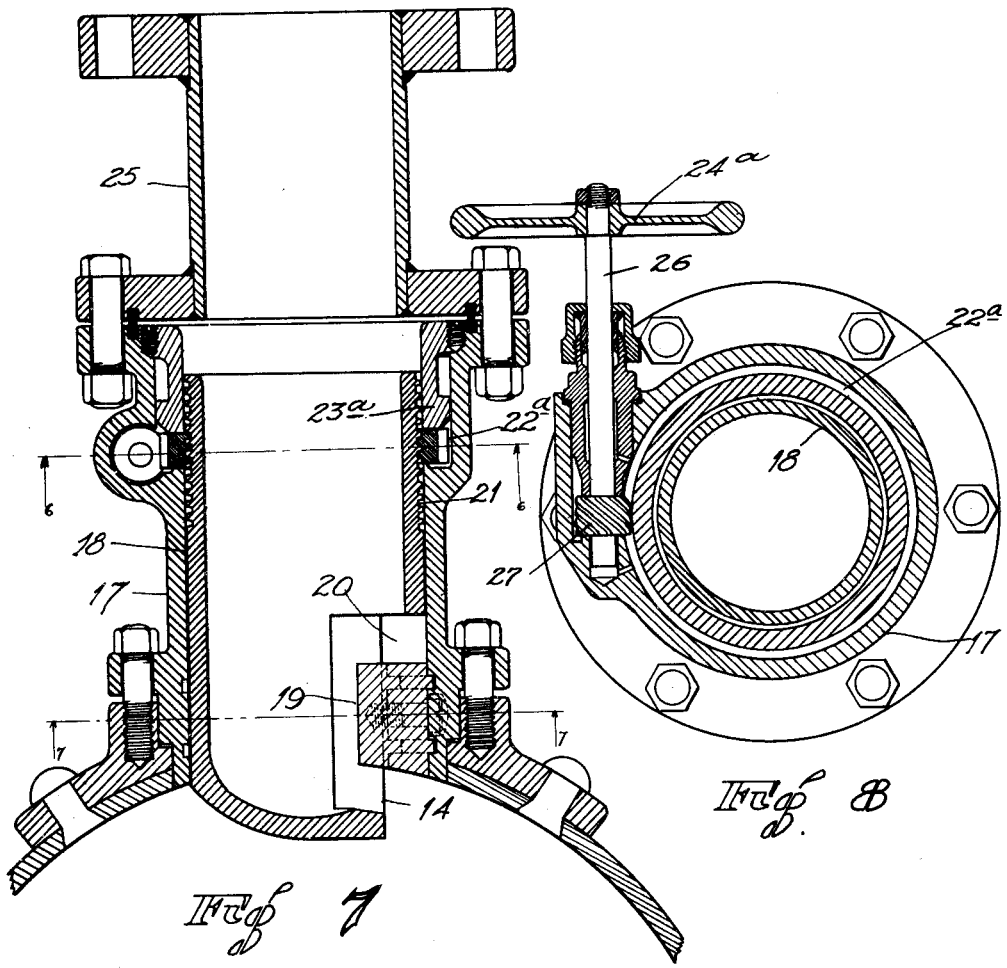
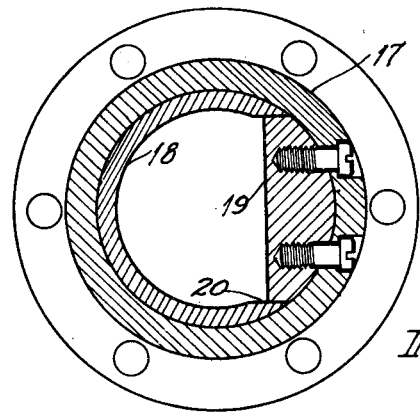

1,741,207

UNITED STATES PATENT OFFICE

CHARLES WALCOTT STRATFORD, OF SAN FRANCISCO, CALIFORNIA

CENTRIFUGAL SEPARATOR AND VALVE THEREFOR

Application filed August 25, 1925. Serial No. 52,368.

The hereinafter described invention relates to the control of either liquid or gaseous fluids in effecting their separation and more particularly the control of such fluids as delivered against curved or tubular surfaces in which the force determined by the velocity of the fluid relative to the surface holds the fluid under close pressure contact with the surface, as in extracting liqid from gases or vapors in which the liquid is carried in entrainment, such as encountered in hydrocarbon vapors, compressed air, natural gas and steam, as well as in separating the vapors liberated from liquid hydrocarbon in a still during the process of distillation or cracking and many other important uses in the industries; it being among the objects of my invention to make effective a surface control of fluids against enclosed curved or tubular surfaces, thereby enabling the principles such as described in my applications Serial No. 19,553, Series of 1925, filed in the United States Patent Office March 30th, 1925, and Serial No. 29,310, Series of 1925, filed in the United States Patent Office May 11th, 1925, and both relating to the delivery of liquids against heated surfaces in effecting their heating and vaporization, to be put into practical use in a highly efficient manner.

As illustrative of one embodiment of my method and its apparatus for carrying out the principles of my invention, reference should be had to the accompanying drawings in which Fig. 1 is an elevation partly in section showing its adaptation in the form of a dephlegmator for use in oil refinery practice, in which hydrocarbon vapors, either hot or at normal temperature, are separated or freed from their entrained liquid, the delivery orifice of the control valve through which the vapors are passed being shown in its adjustable relation to the curved inner surface of the cylindrical casing.

Fig. 1 is an elevational view of the device mounted on a dephlegmator shown in section.

Fig. 2 is a section taken on line 2—2, Fig. 1.

Fig. 3 is a section of the upper portion of the dephlegmator, taken on line 3—3, Fig. 1.

Fig. 4 is a broken section of the top portion of the dephlegmator showing the fluid delivery at right angles to that shown in Fig. 3.

Fig. 5 is a broken sectional view of a portion of the tubular surface of the dephlegmator and the fluid control valve in which one side of the fluid delivery into the cylindrical casing is formed by the inner surface thereof.

Fig. 6 is a section taken on line 5—5, Fig. 5, and shows the means for adjusting the fluid delivery into the cylindrical casing when the tubular surface is employed for forming one side of the fluid delivery orifice.

Fig. 7 is an enlarged sectional view of a modified type of fluid delivery valve.

Fig. 8 is a section taken on line 6—6, Fig. 7, while Fig. 9 is a section taken on line 7—7, Fig. 7.

The apparatus for carrying out the present embodiment of my invention comprises a cylindrical casing 10 provided with a vapor outlet 11 and a fluid outlet 12. Affixed to the casing 10 is the control valve 13, the elongated fluid discharge orifice 14 of which is shown in its adjustable relation to the inner cylindrical surface of the casing 10, the major axis of the elongated orifice 14 being positioned at an angle to the axis of the casing by turning the valve as a unit in the threaded socket 15 as affixed to the casing 10 and held in its set position by the threaded bushing 16, although any equivalent means may be used for this purpose. The control valve 13 comprises in its assembly as essential parts a tubular housing 17, in which is slidably mounted the tubular member 18. Tubular member 18 is shaped on one of its ends to form a part of the fluid delivery orifice 14. Secured to tubular housing 17 is the abutment 19, which serves as a guide to align the tubular member 18 by fitting in the slotted opening 20 therein. The abutment 19 also serves to form the remaining part of the fluid delivery orifice 14. One end of the tubular member 18 is threaded at 21 to receive the nut 22, the latter being confined against endwise movement by the gland and stuffing box 23 affixed to the tubular housing 17. The wheel 24 secured to the nut 22 provides means for moving the said nut, so that upon turning the wheel 24, the tubular member 18 is caused to travel in the tubular housing 17, and the delivery orifice 14 as formed by the end of tubular member 18 and abutment 19 may be fully closed against said abutment or be regulated thereagainst to control the discharge of fluid into the cylindrical casing 10; this adjustment varying the minor axis of the elongated delivery orifice 14 and controlling the velocity of the fluid delivered therethrough. The tubular member 25 communicating in fluid tight joint engagement with the tubular housing 17 serves as a means for connecting the valve 13 to its source of fluid supply.

In Figs. 7, 8 and 9, is shown a modified type of construction of a piston or injection valve consisting of a body portion 17, similar to that described in the foregoing figures. Within the casing is a threaded slidable tubular member 18; meshing with the exterior threads of the tubular member 18 is a ring nut 22ª confined against all by rotative movement by the housing 17 and retaining ring 23ª. The functioning or movement of the valve or the tubular member 18 which varies the orifice opening 14, is effected in the modified type of valve shown in Figs. 7 and 8, by turning the hand wheel shown in Fig. 8. The rotative movement of the hand wheel is transmitted through the stem 26 upon the lower end of which is mounted a spiral gear or worm wheel 27. This worm meshes with the exterior threads on the outside of the ring nut 22ª. The interior threads of this ring nut mesh with the exterior threads of the tubular member 18. Therefore rotative movement of the hand wheel is transmitted into a slidable movement of the tubular member or valve. This movement of the tubular member, as explained in the foregoing description in the previous figures, varies the size of the orifice openings.

My invention provides a method which insures the maximum effect of the force determined by the velocity of the fluid relative to the surface against which it is delivered, the fluid being held under close pressure contact with the surface, a squeezing action taking place between the fluid and the surface causing a rapid and economical separation of its liquid and vapor content.

In the accomplishment of this I cause the fluid to travel about the inner tubular surface in an unrestricted spiral course in making its first complete turn thereon. By this I mean that the fluid from the point of its delivery until it has made at least one full circuit about the surface shall be without restriction that will detract from its velocity. I prevent the fluid, whether introduced in vapor or liquid form, from reacting upon itself or contacting any impediment in its initial spiral course about the inner tubular surface. I have found that any obstruction which occurs between the first liquid course laid down on the tubular surface and the fluid delivery thereagainst, whether such obstruction be liquid or solid, causes a partial or total destruction of the velocity of the fluid, and in the case of separating the liquid carried in entrainment in the vapor as liberated from the distillation of crude oil, an atomization of the liquid constituent of the vapor occurs, a portion of the atomized liquid being carried over into the vapor discharge so that upon condensation of the vapor a discoloration of the liquid resulting therefrom occurs necessitating a re-evaporation of such liquid into the vapor phase in order to produce a vapor upon the condensation of which a clear marketable liquid hydrocarbon product, such as benzine, gasoline or kerosene will result. This very expensive operation is entirely eliminated by my method. I find also that in the case of handling volatile liquids to separate the vapor content thereof, any impediment to the initial velocity of the liquid as delivered against the tubular surface causes the liquid to leave or jump the surface making a break in the liquid layer before it again contacts the surface, partially, if not totally, destroying the force determined by the velocity of the fluid relative to the surface, which it is the purpose of my invention to preserve to the highest degree in continuously holding the fluid under pressure contact with said surface.

The clearance between the fluid inlet into the cylindrical casing and the initial spiral liquid course delivered on the inner surface thereof is denoted at X, the pitch line of said course being noted, and the course of the fluid on the tubular surface being illustrated by the diagrammatical path AB which clearly shows the fluid as laid down on the tubular surface passing by the fluid inlet without restriction or retardation thereby, a full clearance being effected.

I desire it to be understood that any reasonable interpretation or modification of my invention may be made by those skilled in the art and that the one embodiment herein set out is illustrative and descriptive only of its principles, the scope of my invention being limited only by its claims.

I claim:—

1. Apparatus for separating fluids comprising a cylindrical casing, a fluid delivery conduit terminating within the casing in an elongated orifice, means to adjust said conduit whereby to adjust said orifice and regulate the flow of fluid therethrough against the curved inner surface of said casing and means to turn said conduit whereby to direct the flow of fluid through said orifice against the inner tubular surface.

2. Apparatus for separating fluids comprising a cylindrical container, a fluid delivery conduit terminating within the said container in an elongated orifice, means for varying the area of said orifice, and means for setting the orifice at an angle to the axis of said container to regulate and direct the flow of fluid against the inner curved surface of said container.

3. Apparatus for separating fluids comprising a cylindrical container, a fluid delivery conduit terminating within said container in an elongated orifice, means for varying the area of said orifice, means for setting the orifice at an angle to the axis of said container to regulate and direct the flow of fluid against the inner curved surface of said container, means for conducting vapor from one end of said container and means for coducting liquid from the opposite end thereof.

4. Apparatus for separating fluids comprising a cylindrical casing, a conduit for delivering fluid into the said casing, which conduit is provided with an integral cowled orifice substantially at right angles to the longitudinal axis of the conduit, part of which orifice extends from the inner curved surface of and into said casing and so disposed as to cause fluid to be directed onto said inner curved surface at a point immediately adjacent said orifice, and means for varying the area of said orifice.

5. Apparatus for separating fluids comprising a cylindrical casing, a conduit for delivering fluid into said casing, which conduit is provided with an orifice a part of which extends from the inner curved surface into said casing and so disposed as to cause fluid to be directed onto said inner curved surface at a point immediately adjacent said orifice, means for changing the position of the orifice relative to the casing to vary the pitch of the course of the fluid within the casing, and means for varying the area of said orifice.

6. Apparatus for separating fluids comprising a cylindrical casing, a fluid delivery conduit projecting into said casing and having its dscharge orifice arranged to direct fluid onto and to cause the fluid to travel over the inner curved surface of the casing in a spiral stream of substantially undiminished velocity, and means operable from a point exteriorly of the casing for varying the discharge orifice and the pitch of the spiral stream within the casing.

7. An orifice mechanism for the fluid delivery conduit to a cylindrical centrifugal separator adapted to inject fluid tangentially to the inner surface of said separator, said mechanism radially adjustable relative to the separating cylinder for varying the area of the orifice opening and rotataively adjustable upon its own axis to vary the pitch of the spiral flow of the injected fluid.

8. An orifice mechanism for the fluid delivery conduit to a centrifugal separator adapted to inject fluid tangentially onto the inner surface of said separator, said mechanism having an orifice closure, a hollow slidable piston integral therewith and means for sliding the piston to vary the orifice opening.

CHARLES WALCOTT STRATFORD.